(No Model.)
N. DE BENARDOS.
WORKING METALS BY ELECTRICITY.
No. 379,453. Patented Mar. 13, 1888.
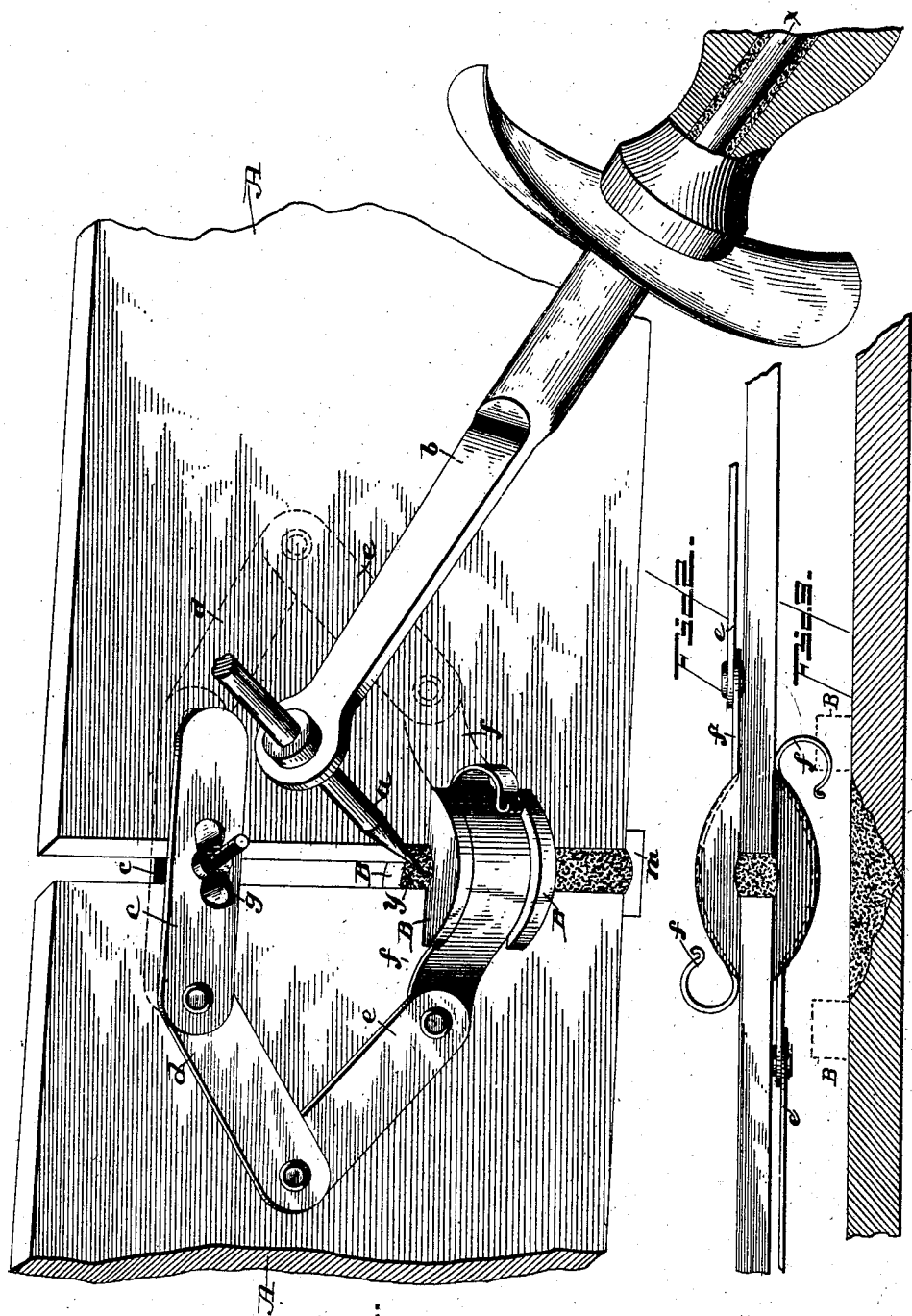
WITNESSES.
Edwin T. Yewell
Marvin A. Custis
INVENTOR
Nicholas de Benardos.
by Macullus Bailey
his Attorney.

UNITED STATES PATENT OFFICE.

NICHOLAS DE BENARDOS, OF ST. PETERSBURG, RUSSIA.

WORKING METALS BY ELECTRICITY.

SPECIFICATION forming part of Letters Patent No. 379,453, dated March 13, 1888.

Application filed December 28, 1887. Serial No. 259,204. (No model.)

*To all whom it may concern:*

Be it known that I, NICHOLAS DE BENARDOS, of St. Petersburg, in the Empire of Russia, have invented a certain new and useful Improvement in Working Metals by Electricity, of which the following is a specification.

My present invention is an improvement on the process of working metals by the direct application of the electric current set forth in the United States Letters Patent No. 363,320, issued to Stanislas Olszewski and myself on May 17, 1887. It has particular reference to the joining or welding together of metals by this process, and is designed more particularly to facilitate the joining together of thick pieces or masses of metal or of plates or pieces of metal which have their meeting edges so situated that the metal, when melted or fused, will be liable to run away from the joint.

In the industrial application and practice of the process aforesaid it is not conveniently practicable to effect the fusion of the metal beyond the depth of, say, from three-eighths to one-half of an inch. When the plates to be joined exceed this thickness, the operation of welding or fusing together their meeting edges under ordinary conditions becomes difficult by reason of the fact that the thickness of the plates is in excess of the depth to which the fusion can be readily effected, so that there is liability of an imperfect joint. To remedy this difficulty, I form by suitable means at the proper point a retaining-pocket between the pieces of metal to be joined together. Into this pocket I introduce metallic scraps suitable to be used in welding or joining said pieces together, and I then by the electric arc reduce or fuse said metallic scraps, the heat generated during this operation serving to bring to the proper temperature the abutting or opposed edges of the pieces of metal which are of course in direct contact with the melted or fused metallic scraps. In this operation the metal to be joined or worked constitutes one pole, and the other pole consists of an extraneous conductor approached thereto, as fully set forth in the Letters Patent hereinbefore referred to.

To a better understanding of my invention, I will now proceed to describe it more in detail by reference to the accompanying drawings, which represent some of the ways in which it may be applied and used.

Figure 1 is a side elevation of two metal plates and the apparatus used in connection with the same, illustrative of the manner in which the vertical meeting edges of the two plates can be joined or welded together in accordance with the invention. Fig. 2 is a top view or plan of the plates and the dams and clamp for holding the said dams in place. Fig. 3 is a sectional view showing a form of pocket which may be used when the plates to be joined are horizontal instead of vertical.

In Fig. 1 the extraneous conductor is the carbon pencil $a$, carried by a holder or handle, $b$, by which the operator is enabled to approach the carbon $a$ to the desired point. Conductor $a$ is electrically connected, through the holder and wire $x$, to one pole of the source of electrical supply, and the plates A are connected to the other pole, all as set forth in the Letters Patent above named. In the case illustrated in Fig. 1 the two plates A, which are of considerable thickness, are vertical, and it is proposed to join their vertical edges. To this end the plates are so placed as to bring their edges opposite and close to one another, but not so close as not to leave between them a space into which scrap metal can be inserted. The two opposed edges of the plates bound this space on two of the four sides. The other two sides are bounded by the dams B, which preferably are carbon blocks.

In Fig. 1 the operation of joining the edges has been completed for a portion of their length, the metal which connects them being shown at $y$. The operation, however, commenced at the lower end of the plates, and in commencing it it is necessary to close the bottom of the pocket by an additional dam or block at the point $m$, the sides of the pocket being formed by the two edges of the plates and the two side dams, B. Into this pocket thus formed scrap metal is introduced, and the conductor $a$ is approached thereto, so as to create the voltaic arc, by which the metal in the pocket will be fused, the heat thus generated serving also to soften the adjacent edges of the plates A and bring them to condition to unite homogeneously and thoroughly with the metal in the pocket. The operation can then be intermitted a sufficient length of time to allow the metal to set, after which the side dams, B, can be moved up to provide a new pocket, (the bottom of which will now be formed by the metal at $y$,) and the operation can thus be continued throughout the length of the edges until the two plates are intimately joined or welded together. As a convenient means of holding and permitting the movement and adjustment of the side dams, B, I make use of two clamps, each consisting of a set of arms, $c\ d\ e\ f$, joined together as shown. The two arms $c$ of the two sets are clamped together and upon opposite sides of the plates by set nut or screw $g$, which passes through the space intervening between the adjoining edges of the plates. The arms $f$, which form the other extremity of the clamps, are free and are fashioned to receive and hold the dams B, which by them are held with spring-pressure against the plates. This arrangement permits the dams B to be adjusted to any desired position. It is preferred to make the inner faces of the dams slightly concave, as seen in Fig. 2, so that there may be a slight excess of metal at $y$, which afterward may be brought down level with the plates by hammering or other suitable means.

In Fig. 3 the plates A (which are of considerable thickness) are horizontal. In this case the pocket can conveniently be formed by slanting or beveling the meeting edges, so that there will be between them a pocket, the sides of which are formed by the slope given to the edges and which at the bottom is closed by the extreme lower edges of the plates which meet at that point. The pocket having thus been formed, metallic scraps or pieces are put in it and the operation of welding or joining together the two plates is then proceeded with in the manner hereinbefore pointed out.

Manifestly the pocket can be formed or provided in a variety of ways and by various means, what is essential (so far as this feature of my invention is concerned) being such a provision (termed by me a "pocket") as will furnish a receptacle for the metal scrap and prevent the fused metal from flowing or running away from the point where it is to be used; and therefore I do not wish to be understood as confining myself to the special ways of forming the pocket, which I have described by reference to the drawings.

Furthermore, with reference to what I have for convenience sake termed "dams" it is to be noted that they should be composed of a material which is practically infusible at the heat to which it is subject during the welding process; and I also much prefer that the said material shall be electrically conductive, because I have noticed that the dams when made of such material not only act in a mechanical capacity to confine the melted metal within bounds, but also have the effect of making a smoother and more finished weld than is produced without them. For instance, in joining metals by the welding process, either as practiced in Letters Patent No. 363,320 or as described in this specification, a somewhat pitted and rough surface is produced at the weld without these dams, whereas if dams (such as carbon) be arranged along the sides or edges of the weld, so as to bound the joint, as indicated, for example, by dotted lines at B, Fig. 3, (said dams having electrical contact with the plates to be joined,) the weld will have a smooth and finished surface.

The metal is melted rapidly by the arc, and often under its action (in the absence of the conductive dams) appears in the form of small drops, which are repulsed and dispersed. When, however, the dams are employed as hereinbefore indicated, this phenomenon is not noticeable, and the result is that a smooth and more finished weld is obtained than otherwise would be the case.

What I claim herein as new and of my own invention is—

1. The improvement in the art of joining metals by means of the directly-applied electric current, which consists in forming a pocket between the edges of the pieces of metal to be joined together, placing metallic scraps or pieces therein, and then melting or fusing said scraps by means of the voltaic arc formed by a conductor approached thereto, which constitutes one pole, while the metal itself constitutes the other pole, as and for the purposes hereinbefore set forth.

2. In the hereinbefore described process of joining metals by means of the directly-applied electric current, the method of confining the melted metal within bounds and also of obtaining a smooth and finished weld, which consists in applying to the sides or edges of the parts to be joined during the welding operation dams of conductive material having electrical connection with said parts, substantially as hereinbefore set forth.

In testimony whereof I have hereunto set my hand this 25th day of October, A. D. 1887.

NICHOLAS DE BENARDOS.

Witnesses:
N. TSCHEKALOFF,
L. VOSS.